United States Patent
Labate

(10) Patent No.: US 11,260,306 B2
(45) Date of Patent: Mar. 1, 2022

(54) MATCHMAKING FOR ONLINE GAMING WITH SIMULATED PLAYERS

(71) Applicant: Electronic Arts, Inc., Redwood City, CA (US)

(72) Inventor: Jesse Alan Labate, San Jose, CA (US)

(73) Assignee: Electronic Arts Inc., Redwood City, CA (US)

( * ) Notice: Subject to any disclaimer, the term of this patent is extended or adjusted under 35 U.S.C. 154(b) by 14 days.

(21) Appl. No.: 16/856,293

(22) Filed: Apr. 23, 2020

(65) Prior Publication Data

US 2021/0331076 A1    Oct. 28, 2021

(51) Int. Cl.
| | |
|---|---|
| A63F 13/795 | (2014.01) |
| A63F 13/798 | (2014.01) |
| A63F 13/847 | (2014.01) |
| A63F 13/358 | (2014.01) |
| A63F 13/335 | (2014.01) |

(52) U.S. Cl.
CPC .......... *A63F 13/795* (2014.09); *A63F 13/335* (2014.09); *A63F 13/358* (2014.09); *A63F 13/798* (2014.09); *A63F 13/847* (2014.09); *A63F 2300/556* (2013.01); *A63F 2300/558* (2013.01); *A63F 2300/5566* (2013.01)

(58) Field of Classification Search
CPC ....................... A63F 13/795; A63F 2300/5566
See application file for complete search history.

(56) References Cited

U.S. PATENT DOCUMENTS

| | | | | |
|---|---|---|---|---|
| 6,887,159 | B2* | 5/2005 | Leen ..................... | G07F 17/323 463/42 |
| 10,940,393 | B2* | 3/2021 | Somers ................... | G06N 3/088 |
| 10,987,589 | B2* | 4/2021 | Lai ......................... | A63F 13/798 |
| 2006/0246973 | A1* | 11/2006 | Thomas .................. | A63F 13/42 463/4 |
| 2007/0054717 | A1* | 3/2007 | Youm .................... | A63F 13/57 463/1 |
| 2008/0242420 | A1* | 10/2008 | Graepel ................. | A63F 13/12 463/42 |
| 2012/0021823 | A1* | 1/2012 | Youm ................... | A63F 13/497 463/29 |
| 2014/0274370 | A1* | 9/2014 | Shah ...................... | A63F 13/12 463/31 |
| 2019/0354759 | A1* | 11/2019 | Somers .................... | G06T 7/70 |
| 2020/0289943 | A1* | 9/2020 | Rico ..................... | A63F 13/795 |
| 2020/0298130 | A1* | 9/2020 | Lai .......................... | A63F 13/67 |

* cited by examiner

*Primary Examiner* — Jay Trent Liddle
(74) *Attorney, Agent, or Firm* — Lee & Hayes, P.C.

(57) ABSTRACT

A matchmaking system matches players for online gaming, when some of the players may be human players and others may be simulated players. The matchmaking system may determine a first skill score associated with a first player for an online game, determine a behavior simulation model for a simulated player is available for the online game, determine a second skill score associated with the behavior simulation model for the online game, and determine the behavior simulation model matches with the first player based at on the first skill score being within a threshold of the second skill score. The matchmaking system may then instantiate a simulated player based on the behavior simulation model and instantiate the online game with the first player and the simulated player.

19 Claims, 8 Drawing Sheets

300

| PLAYER | SKILL SCORE | BEHAVIOR SIMULATION MODEL AVAILABLE? | ONLINE? |
|---|---|---|---|
| PLAYER A | 80 | YES | YES |
| PLAYER B | 62 | YES | NO |
| PLAYER C | 48 | NO | YES |
| PLAYER D | 80 | NO | YES |
| PLAYER E | 71 | YES | NO |
| PLAYER F | 54 | YES | YES |
| PLAYER G | 88 | NO | YES |
| PLAYER H | 87 | YES | NO |
| PLAYER I | 52 | YES | NO |

ONLINE GAME 1: PLAYER A, PLAYER G, PLAYER H*
ONLINE GAME 2: PLAYER B*, PLAYER C, PLAYER F, PLAYER I*
ONLINE GAME 3: PLAYER D, PLAYER E*

FIG. 3

| PLAYER | SKILL SCORE | BEHAVIOR SIMULATION MODEL AVAILABLE? | ONLINE | TEAM HISTORY | PLAY STYLE |
|---|---|---|---|---|---|
| PLAYER A | 80 | YES | YES | D, H | AGGRESSIVE |
| PLAYER B | 62 | YES | YES | C | PASSIVE |
| PLAYER C | 48 | NO | YES | B | PASSIVE |
| PLAYER D | 89 | NO | YES | A | AGGRESSIVE |
| PLAYER E | 80 | YES | NO | G | AGGRESSIVE |
| PLAYER F | 54 | YES | NO | I | PASSIVE |
| PLAYER G | 75 | NO | YES | A | AGGRESSIVE |
| PLAYER H | 87 | YES | NO | A | AGGRESSIVE |
| PLAYER I | 52 | YES | NO | F | PASSIVE |

600

TEAM 1: PLAYER A, PLAYER D   v.   TEAM 2: PLAYER G, PLAYER E*
TEAM 3: PLAYER B, PLAYER C   v.   TEAM 4: PLAYER F*, PLAYER I*

FIG. 6

MATCHMAKING FOR ONLINE GAMING WITH SIMULATED PLAYERS

BACKGROUND

Online gaming allows for players to play a variety of electronic and/or video games with each other via network connectivity, such as via the Internet. Users who wish to play a game may be matched with each other to play the game, even though those players may be remotely located from each other. Online gaming may be enabled by gaming system(s) to which each of the players may connect using client devices. In online gaming, frustration may arise from failures to find, or delays in finding, suitable matches with other players.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 3 illustrates a chart of an example set of player and simulated players for matchmaking according to each player's respective skill score and the availability of behavior simulation models based on respective human players, in accordance with example embodiments of the disclosure.

FIG. 6 illustrates a chart of an example set of player and simulated players for matchmaking according to each player's respective skill score and the availability of behavior simulation models based on respective players, in accordance with example embodiments of the disclosure.

DETAILED DESCRIPTION

Figure 1:
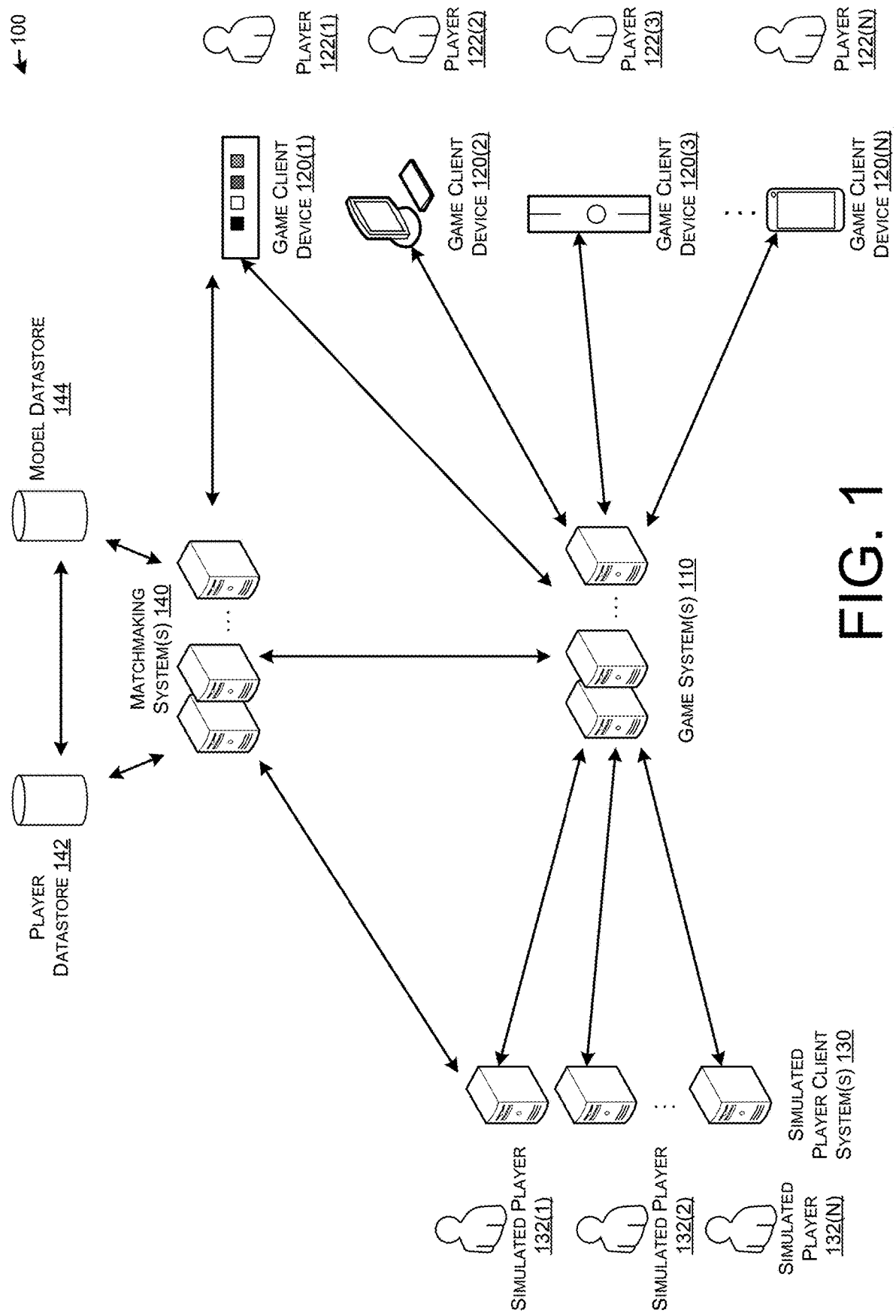
FIG. 1 illustrates a schematic diagram of an example environment with gaming system(s) to enable online gaming via game client device(s) and simulated player client device(s), in accordance with example embodiments of the disclosure.

Example embodiments of this disclosure describe methods, apparatuses, computer-readable media, and system(s) for matching players and simulated players for online gaming. In example embodiments of the disclosure, players who play an online game may be matched with each other and simulated players in accordance with the disclosure herein.

For online games, a suitable opponent or teammate for a player attempting to matchmake may not be available, due to, for example, user location, latency or connection quality, time of day, player population, etc. As such, the result of a matchmaking attempts between players may be unsatisfactory due to, for example: a suboptimal opponent or teammate being selected (skill imbalance, poor latency or connection quality); an extended wait time before a suitable opponent or teammate is found or becomes available; or matchmaking may fail when no opponent or teammate is found or becomes available (e.g. due to a timeout or the player canceling matchmaking due to the wait) which results in no gameplay occurring.

The matchmaking, as disclosed herein, may utilize simulated players to compensate for the unavailability of suitable human opponents or teammates. Further, the matchmaking between players and simulated players and the subsequent online gameplay therebetween may be performed such that the online gaming experience is preserved.

For example, the simulated players may be operated using machine learned models that may be based on the behavior of corresponding human players. For example, a machine learned model corresponding to a human player may be trained based on inputs of the corresponding human player in various situations. As a result of the training, the machine learned model may behave in a similar manner to the corresponding human player when presented with similar situations. In other examples, the machine learned models may be generic simulations of a player of a given skill level. Such generic simulations may be trained based on aggregated behavior data from human players of the generic skill level. Though embodiments are not limited to any particular system or method of generating the underlying instructions or logic that may operate simulated players (e.g., whether using machine learned models, other machine learning or explicit programming), an example for generating and operating simulated players is given in U.S. patent application Ser. No. 15/985,347, which is incorporated by reference herein in its entirety. Machine learned models or other logic (e.g., whether using machine learned models, other machine learning, explicit programming or logic created in any other manner) that may operate the simulated players may be referred to herein as behavior simulation models.

In some examples, players who wish to play an online game may be matched to each other by one or more matchmaking system(s) based at least in part on historical metrics associated with each of the players. Some example matchmaking factors may be related to behavior and may include playstyle, skill score, and so on. Some matchmaking factors may be character or setup related such as character class, team choice, position or role preference, and so on. Other matchmaking factors may be related to team mates or teams of the human players the simulated players are based on.

Taking skill score as an example, based at least in part on historical game play, each player may have a corresponding skill score. A player who exhibits a relatively higher level of skill compared to another player may have a higher skill score than the other player. When a plurality of players wish to play an online game, the online game may be formed by matching players with relatively similar skill scores. By enabling games with players of relatively similar skill scores, and therefore relatively similar skill levels, a more enjoyable game may be achieved for the players than if there is a relatively high disparity in the skill scores and/or skill levels of the players. The skill score of each of the players may be associated with the respective players by way of a user account for each of the players. The user account for each of the players may associate various information about the respective players, including his or her skill score, and may be stored in a player database and accessed by one or more matchmaking system(s).

Matchmaking human players and simulated players using team histories and/or playstyles may make the simulated players appear more natural and satisfying. In a first example, the matchmaking may match a human player with simulated teammates that are based on other players the human player plays with regularly. In this way, the simulated player teammates may behave in a more natural or expected manner from the perspective of the human player. In a second example, the matchmaking may provide groups of opponents (e.g., on an opposing team) that are based on corresponding human players which play together. Because the behavior of the team of simulated players is based on the behavior of a team of human players that play as a group normally, the simulated players may operate more cohesively, thereby providing more satisfying opponent teams.

Further, a database or catalog of behavior simulation models or simulated players may be maintained and utilized for matchmaking. In some examples, the database or catalog of machine learned models or simulated players may include data regarding the same or similar factors as used to match human players with one another.

In addition, the online gaming systems utilizing the matchmaking techniques discussed herein may operate the simulated players to include latency. In particular, human players may engage with the game via game client device(s), which render the game locally at the client device. In many cases, network latency and/or network bandwidth limits associated therewith may result in a delay in the rendering of the game for a human player. This latency, in turn, may cascade to a disadvantage in response times of human players to events in the online game relative to simulated players (e.g. simulated players operating locally to the game system(s)). More particularly, simulated players without latency may exhibit superhuman reaction times or similarly noticeable deviations from human players, thereby disrupting the gaming experience and disadvantaging human players. The disclosed embodiments, as described herein, match human players and simulated players, taking into account disadvantages the human players may face during game play due to latency. In some examples, the simulated players may be provided by simulated player client system(s) that may be remote from the game system(s) hosting the online games. As such, the behavior simulation models that may provide the simulated player inputs may experience latency in receiving online game data from the gaming system(s) hosting the online games. In addition or alternatively, some simulated players may be provided locally to the gaming system(s) hosting the online games but the interface between the online game hosting application and the input to the behavior simulation models may include a soft delay (e.g. a delay provided in the software or by instructions) that may provide a similar effect to latency. Unless otherwise explicitly stated, as used herein, latency in simulated players includes both latency due to hardware or system setup and soft delays.

Moreover, and as alluded to above, to maintain the online game experience, simulated players may be presented to matched human players as if they were human players (e.g. a simulated player based on an unavailable human player may be presented to a matched opponent as if the actual human player were controlling the simulated player).

Further, as a human player corresponding to a simulated player engages additional gameplay, the matchmaking and online gaming system disclosed herein may perform additional training on the corresponding behavior simulation models to update or adapt the behavior of the corresponding simulated player. In this manner, the simulated player presented to another human player (e.g., as teammate or opponent) may continue to mimic the corresponding human player upon which the simulated player's behavior is based, even as the corresponding human player's behaviors and playstyle evolve over time.

As an example incorporating the above discussed features, in a situation where there are no suitable human opponents available for a player trying to matchmake or where a long wait is going to occur, the matchmaking algorithm may be applied against a catalogue of simulated players that mimic the behavior of corresponding human players, as if they were the mimicked players. The matched simulated player(s) may then be operated with a latency in communication of online game data between the simulated player client system(s) and the game system(s) hosting the online game to provide a more normal experience for the human players.

Certain implementations and embodiments of the disclosure will now be described more fully below with reference to the accompanying figures, in which various aspects are shown. However, the various aspects may be implemented in many different forms and should not be construed as limited to the implementations set forth herein. It will be appreciated that the disclosure encompasses variations of the embodiments, as described herein. Like numbers refer to like elements throughout.

FIG. 1 illustrates a schematic diagram of an example environment 100 with game system(s) 110, game client device(s) 120 and simulated player client system(s) 130 that enable online gaming, in accordance with example embodiments of the disclosure.

The example environment 100 may include one or more human player(s) 122(1), 122(2), 122(3), . . . 124(N), hereinafter referred to individually or collectively as human player(s) 122, who may interact with respective game client device(s) 120(1), 120(2), 120(3), . . . 120(N), hereinafter referred to individually or collectively as game client device (s) 120 via respective input device(s).

The example environment 100 may further include one or more simulated player(s) 132(1), 132(2), . . . 132(N), hereinafter referred to individually or collectively as simulated player(s) 132, who may be simulated by simulated player client system(s), hereinafter referred to individually or collectively as simulated player client system(s) 130

The game client device(s) 120 and the simulated player client system(s) 130 may receive game state information from the one or more game system(s) 110 that may host the online game played by the human player(s) 122 and/or simulated player(s) 132 of environment 100. The game state information may be received repeatedly and/or continuously and/or as events of the online game transpire. The game state information may be based at least in part on the interactions that each of the human player(s) 122 and/or simulated player(s) 132 have in response to events of the online game hosted by the game system(s) 110.

The game client devices 120 may be configured to render content associated with the online game to respective human players 122 based at least on the game state information. More particularly, the game client device(s) 120 may use the most recent game state information to render current events of the online game as content. This content may include video, audio, haptic, combinations thereof, or the like content components. Similarly, the simulated player client system(s) 130 may be configured to present the game state information to the behavior simulation models that provide the behaviors of the simulated player(s).

As events transpire in the online game, the game system(s) 110 may update game state information and send that game state information to the game client device(s) 120 and simulated player client system(s) 130. For example, if the human players 122 and/or simulated players 132 are playing an online soccer game, and the human player 122 or simulated player 132 playing one of the goalies moves in a particular direction, then that movement and/or goalie location may be represented in the game state information that may be sent to each of the game client device(s) 120 and simulated player client system(s) 130 for rendering the event of the goalie moving in the particular direction. In this way, the content of the online game is repeatedly updated throughout game play.

When the game client device(s) 120 receive the game state information from the game system(s) 110, a game client device 120 may render updated content associated with the online game to its respective human player 122. This updated content may embody events that may have transpired since the previous state of the game (e.g., the movement of the goalie).

The game client device(s) 120 may accept input from respective human players 122 via respective input device(s). The input from the human players 122 may be responsive to events in the online game. For example, in an online basketball game, if a human player 122 sees an event in the rendered content, such as an opposing team's guard blocking the point, the human player 122 may use his/her input device to try to shoot a three-pointer. The intended action by the human player 122, as captured via his/her input device, may be received by the game client device 120 and sent to the game system(s) 110.

The game client device(s) 120 may be any suitable device, including, but not limited to a Sony Playstation® line of systems, a Nintendo Switch® line of systems, a Microsoft Xbox® line of systems, any gaming device manufactured by Sony, Microsoft, Nintendo, or Sega, an Intel-Architecture (IA)® based system, an Apple Macintosh® system, a netbook computer, a notebook computer, a desktop computer system, a set-top box system, a handheld system, a smartphone, a personal digital assistant, combinations thereof, or the like. In general, the game client device(s) 120 may execute programs thereon to interact with the game system(s) 110 and render game content based at least in part on game state information received from the game system(s) 110. Additionally, the game client device(s) 120 may send indications of player input to the game system(s) 110. Game state information and player input information may be shared between the game client device(s) 120 and the game system(s) 110 using any suitable mechanism, such as application program interfaces (APIs).

When the simulated player client device(s) 130 receive the game state information from the game system(s) 110, the simulated player client device(s) 130 may present the updated content associated with the online game to the behavior simulation model corresponding to its simulated player 132. This updated content may embody events that may have transpired since the previous state of the game (e.g., the movement of the goalie).

The simulated player client device(s) 130 may generate simulated input for the respective simulated players 132. The input from the simulated players 132 may be responsive to events in the online game. For example, in the online basketball game discussed above, if the game state information input to the behavior simulation model indicates an event has occurred in the online game, such as an opposing team's guard blocking the point guard, the behavior simulation model of the simulated player 132 may generate simulated input to try to shoot a three-pointer. The simulated input generated by the behavior simulation model for the simulated player 132 may be sent to the game system(s) 110.

The game system(s) 110 may receive inputs from various human player(s) 122 and/or simulated player(s) 132 and update the state of the online game based thereon. As the state of the online game is updated, the state may be sent to the game client device(s) 120 for rendering online game content to human players 122 and to the simulated player client system(s) 130 presentation to the behavior simulation models of the simulated players 132, respectively. In this way, the game system(s) 110 may host the online game.

The example environment 100 may further include matchmaking system(s) 140 to match human players 122 who wish to play the same game and/or game mode with each other and with simulated players 132. The matchmaking system(s) 140 may receive an indication from the game system(s) 110 of human players 122 who wish to play an online game.

The matchmaking system(s) 140 may initially attempt matchmaking between human players 122 without considering simulated players 132. Then, when an opponent for a human player 122 cannot be found or one or more slots in one or more teams are unfilled due to a lack of suitable human players 122 (e.g., a suitable human player 122 is unavailable), the matchmaking system(s) 140 may attempt to match with simulated players 132.

Whether a human player 122 is considered unavailable and whether matching with a simulated player 132 based on an unavailable human player 122 is allowed may vary depending on the implementation.

In some implementations, a human player 122 may not be considered unavailable, and matching for the corresponding simulated player 132 may not be allowed, unless the human player 122 is not present in the matchmaking system(s) 140 (e.g., is offline). Such an implementation may be chosen to avoid disrupting the gaming experience, for example, by having multiple other human players referring to simultaneous matches against a single other player (e.g., when in reality one is facing the human player 122 and the other is facing the simulated player 132). This may be especially desirable where the simulated players 132 are presented as if controlled by real players.

In other implementations, a human player 122 may be considered unavailable when unsuitable for a match based on one factor or a combination of factors. For example, a human player 122 may be considered unavailable if the human player 122 is unsuitable for a match based on one or more of geographical location, latency or connection quality, time of day, player population, etc. In some such implementations, the matchmaking system(s) 140 may be configured to utilize simulated player 132 based on human players 122 whenever the human player 122 is determined to be unsuitable for a match, even when the human player is online and present in the matchmaking system. For example, if human player A and human player B are present in the matchmaking system(s) 140, and are a good match, save for connection quality, the matchmaking system(s) 140 may match human player A and human player B with simulated player B and simulated player A, respectively, as opponents.

Many other variations may be utilized including freely utilizing simulated players 132 regardless of whether the corresponding human player 122 is online and even suitable for the match but other considerations bias the player selection toward the human player's 122 simulated counterpart.

As discussed below, the factors considered in matching simulated players 132 to human players 122 may be the same or similar to those utilized when only matching human players 122.

The matchmaking system(s) 140 may access information about the human player(s) 122 and/or simulated player(s) 132 who wish to play a particular online game, such as from a player datastore 142 and a model datastore 144. A user account for each of the human players 122 may associate various information about the respective human players 122 and may be stored in the player datastore 142 and accessed by the matchmaking system(s) 140. Similarly, the model datastore 144 may include model datastore entries for respective behavior simulation models of simulated players 132. The model datastore entries may include the same or similar information utilized in matchmaking as the user accounts stored in the player datastore 142. Of course, either the user accounts or the model datastore entries may include additional or different information in accordance with the particular implementation.

Human player(s) 122 and/or simulated player(s) 132 may be matched according to one or more metrics associated with the human player(s) 122 and/or simulated player(s) 132, such as skill at a particular game.

In a skill score based matchmaking example, when a plurality of human players 122 wish to play an online game, the online game may be formed by matching human players 122 with relatively similar skill scores. A player's skill score in a particular game may be an estimate of a player's expected performance in that game based at least in part on historic game performance data. A player who exhibits a relatively higher level of skill compared to another player may have a higher skill score than the other player. By enabling games with players of relatively similar skill scores, and therefore relatively similar skill levels, a more enjoyable game may be achieved for the players than if there is a relatively high disparity in the skill scores and/or skill levels of the players.

Once the matchmaking system(s) 140 has accessed the player skill scores, the matchmaking system(s) 140 may be configured to match human player(s) 122 and/or simulated player(s) 132 based at least in part on their respective skill scores. As mentioned above, the matchmaking system(s) 140 may not attempt to match simulated players 132 into the online game(s) unless the matchmaking fails to find suitable human players 122. In some examples, the skill scores assigned to simulated players 132 may be based on the skill scores of the human player upon whose behavior the corresponding behavior simulation model is based.

In addition to or alternatively to skill scores, human players 122 and simulated players 132 may be matched on a variety of other factors.

Some example matchmaking factors may be related to behavior in addition to skill and may include a player's playstyle. For example, when matching human player(s) 122 and/or simulated player(s) 132 as a team for a team deathmatch, the matchmaking system(s) 140 may favor matching human player(s) 122 and/or simulated player(s) 132 that exhibit similar levels of aggression or a mix of levels of aggression. This may alleviate the frustration experienced by players when deathmatch teams split up due to different players utilizing different tactics. Splitting a deathmatch team into different groups using different tactics can often result in a loss to an opposing team operating as a single unit with a shared tactical approach. In another example, when matching human player(s) 122 and/or simulated player(s) 132 as a team for a team-based sports game (e.g., an online team based American football game), the matchmaking system(s) 140 may favor matching human player(s) 122 and/or simulated player(s) 132 based on whether the players employ strategies consistent with real-life football games (e.g., kicking extra points or attempting a two point conversion according to the situation) in the online game or employ overly aggressive, fanciful, or unrealistic strategies inconsistent with real-life football games (e.g., always attempting the two point conversion or attempting to convert every fourth down). Many other aspects of players' playstyles may be utilized in matchmaking. The aspects of players' playstyle utilized for different genres or different individual games may vary from example to example.

Some example matchmaking factors may be character or setup related such as character class, team choice, position or role preference, and so on. For example, when matching human player(s) 122 and/or simulated player(s) 132 for an online roleplaying game, the matchmaking system(s) 140 may consider the character classes of the human player(s) 122 and/or simulated player(s) 132. In such examples, the aspects of the playstyles of the human player(s) 122 and/or simulated player(s) 132 utilized in matchmaking may be specific to the character or setup related factors for a slot in the matchmaking that is to be filled. The character or setup related factors of human players 122 may be determined by the settings or character selected by the individual human players 122 when requesting matchmaking. The matching of simulated players 132 may be performed using the same or similar factors but may be triggered by the matchmaking finding no suitable human player 122. Further, the matching of simulated players 132 may be performed using characters or setups stored in the model datastore entries for respective behavior simulation models. For example, a behavior simulation model may be created for the behavior of a human player when playing as a particular class, role or position. Other behavior simulation models may be created for the same human player when playing as other classes, roles or positions. Returning to the online role playing game example above, in setting up a team for a fantasy game, when no suitable human player 122 is available to fill a healer slot in the team, the matchmaking system(s) 140 may search the model datastore 144 to find a behavior simulation model that may provide a simulated player 132 with a character class of healer and other attributes that render the simulated player a suitable match for the team.

Other matchmaking factors may be related to teammates or teams of the human players 122 or the human players 122 the simulated players 132 are based on. In a first example, the matchmaking may match a human player 122 with simulated teammates that are based on other players the human player plays with regularly. In this way, the simulated teammates may behave in a more natural or expected manner from the perspective of the human player 122. In a second example, the matchmaking may provide groups of opponents (e.g., on an opposing team) that are based on corresponding human players 122 which play together. Because the behavior of the team of simulated players 132 is based on the behavior of a team of human players 122 that play as a group normally, the simulated players 132 may operate more cohesively, thereby providing more satisfying opponent teams.

Having matched the human player(s) 122 and/or simulated player(s) 132, the matchmaking system(s) 140 may trigger and instruct generation of instance(s) of the online game(s) for the match(es). More particularly, the matchmaking system(s) 140 may send the behavior simulation model(s) of any simulated player(s) 132 to be included in an instance of the online game to the simulated player client system(s) 130 with instructions for the simulated player client system(s) 130 to instantiate the simulated player 132 using the behavior simulation model. The matchmaking system(s) 140 may then request the game system(s) 110 instantiate an online game between the matched human players 122 and simulated players 132. For example, the matchmaking system(s) 140 may provide connection information for the game client device(s) 120 and simulated player client system(s) 130 to the game system(s) 110 for instantiation of an instance of the online game between the matched human players 122 and simulated players 132.

In some examples, the online gaming system(s) 110 utilizing the matchmaking techniques discussed herein may operate the simulated players 132 to include latency. In particular, human players 122 may engage with the game via the game client device(s) 120, which are remote from the game system(s) 110. In many cases, network latency and/or network bandwidth limits associated therewith may result in a delay in the rendering of the game for a human player 122. This latency, in turn, may cascade to a disadvantage in response times of human players 122 to events in the online game relative to simulated players 132, for example, where the simulated players are operated locally to game system(s) 110. For example, the simulated player client system(s) 130 providing the simulated player(s) 132 may be computing devices located closer to the game system(s) 110 (e.g. same city or region) than the game client device(s) 120 of the human player(s) 122 or even by computing devices within a same data center or computing cluster as the game system(s) 110. In such cases, the simulated players 132 without latency may exhibit superhuman reaction times or similarly noticeable deviations from human players 122, thereby disrupting the gaming experience and disadvantaging human players 122. The disclosed embodiments, as described herein, provide simulated players 132, taking into account disadvantages the human players 122 may face during game play due to latency. In some examples, the simulated players 132 may be provided by simulated player client system(s) 130 that may be remote from the game system(s) hosting the online games. As such, the behavior simulation models that may provide the simulated player 132 inputs may experience latency in receiving online game data from the gaming system(s) 110 hosting the online games. In addition or alternatively, some simulated players 132 may be provided locally to the gaming system(s) 110 hosting the online games (e.g. in the same data center or computing cluster as the game system(s) 110) but the interface between the online game hosting application and the input to and/or output of the behavior simulation models may include a soft delay (e.g. a delay provided in the software or by instructions) that may provide a similar effect to latency. Unless otherwise explicitly stated, as used herein, latency in simulated players 132 may include either or both latency due to hardware or system setup and soft delays.

In some examples, the matchmaking system(s) 140 may generate the behavior simulation models based on the behavior of players playing the online game (e.g., replays of gameplay by human players 122). As discussed above, the behavior simulation models may accept as input the game state information and output control input for an online game. The control inputs output by the behavior simulation models may be the same or similar to the control inputs output by the game client device(s) 120 in response to inputs from the human players 122. In some examples, the control inputs may control characters, units and so on of the human player 122 or simulated player 132. As such, the behavior simulation models may be configured to control units or make decisions that emulate characteristics of human playstyles by outputting similar control data as normally generated in response to the inputs received from a human player.

In some examples, the behavior simulation models may be machine learned models that are trained based on the behavior of respective human players. For example, a behavior simulation models for a respective human player may be trained based on inputs of the respective human player in various situations. As a result of the training, behavior simulation models may behave in a similar manner to the respective human player when presented with similar situations. In other examples, the behavior simulation models may be generic simulations of players of a given skill level. Such generic simulations may be trained based on aggregated behavior data from human players of the generic skill level. Though embodiments are not limited any particular system or method of generating the underlying instructions or logic that may operate simulated players (e.g. whether using machine learned models, other machine learning or explicit programming), an example for generating and operating simulated players is given in U.S. patent application Ser. No. 15/985,347, which is incorporated by reference herein in its entirety.

Further, as a human player 122 upon which a behavior simulation model engages additional gameplay, the gaming system(s) 110 may provide the matchmaking system(s) 140 with additional behavior data. The matchmaking system(s) 140 may then perform additional training on the behavior simulation model to update or adapt the behavior of the simulated player 132. In this manner, the simulated player 132 presented to another human player 122 (e.g. as a teammate or an opponent) may continue to mimic the respective human player upon which the behavior simulation model's behavior is based, even as the respective human player's behaviors and playstyle evolve over time. Similar additional training may be applied to behavior simulation models which are based on aggregated behavior data of multiple players (e.g. additional training may be performed as more behavior data is collected).

As alluded to above, to maintain the online game experience, simulated players 132 may be presented to the human players 122 as if they were human players (e.g. a simulated player based on an unavailable human player may be presented to an opponent human player 122 as if the actual respective player were controlling the simulated player 132). Alternatively or additionally, the simulated players 132 may presented in a similar manner to the presentation of human players to opponents but with an indication that the simulated player 132 is simulated.

Though example implementation details are discussed above, variations are possible. For example, other implementations may utilize the player datastore 142 to match for simulated players 132. For example, rather than or in addition to having a separate model datastore, the behavior simulation models may be attached to user account data or otherwise to the player datastore entries of the associated human players 122 in the player datastore 142.

In another example variation, human players 122 may be matched against simulated players 132 outside of a matchmaking search process. For example, a human player 122 may be matched against a simulated player without the use of a matchmaking search process when the simulated player is used as a milestone, benchmark, or proof of competency of the human player 122. Some online games may have leagues or tiers of gameplay that may require the human players 122 to overcome one or more challenges to prove capability. In such a case, a human player 132 may matched with and/or against simulated players 132 based on respective human players 122 or aggregated human player behavior data collected from groups of human players 122 matching certain characteristics and skill scores. In a particular example, human players 122 may be required to defeat the simulated player 132 provided by a behavior simulation model for a particular human player to qualify for a league, competition or tier of the online game. In this way, the human players 122 may have a more standardized challenge for entry.

Figure 2:
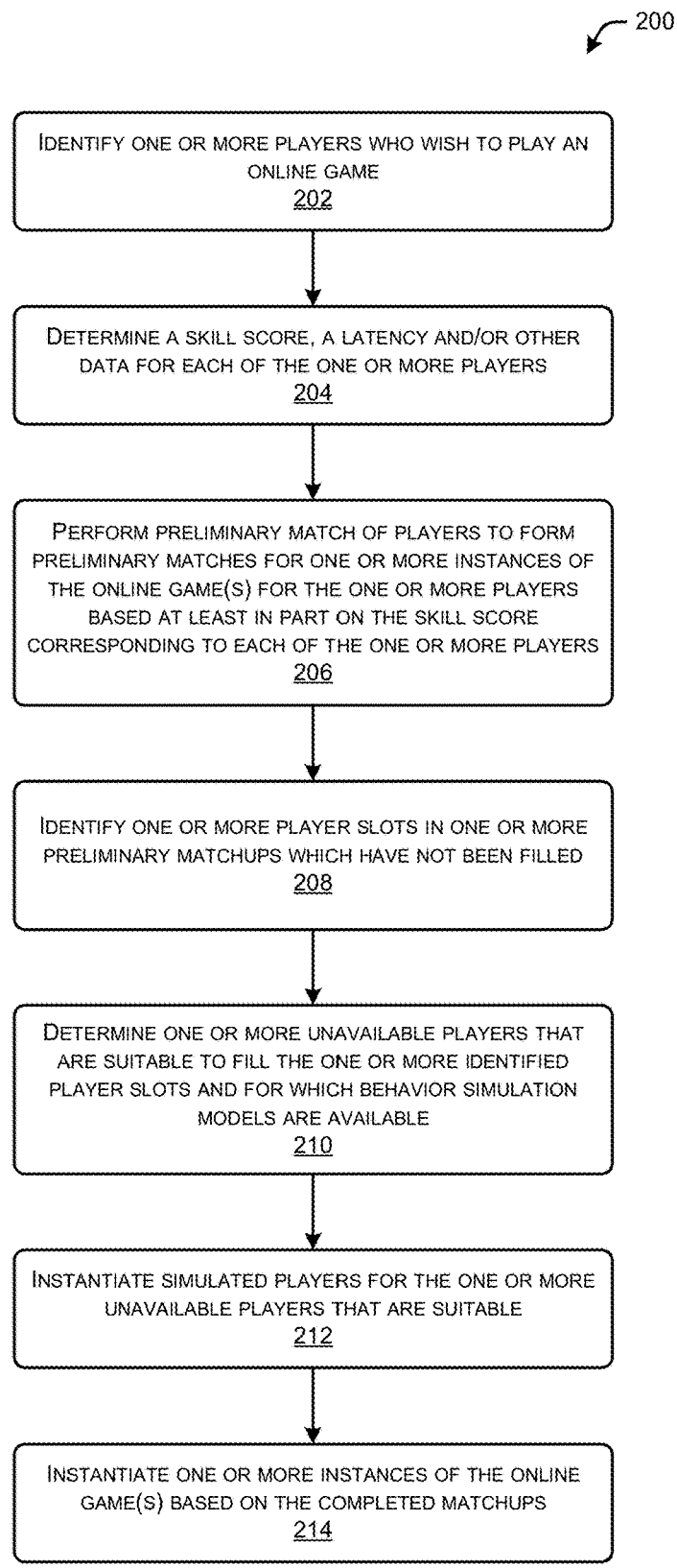
FIG. 2 illustrates a flow diagram of an example method to match players and simulated players to form one or more online games, in accordance with example embodiments of the disclosure.

FIG. 2 illustrates a flow diagram of an example method 200 to match players to form one or more online games including human players and simulated players, in accordance with example embodiments of the disclosure. The method 200 may be performed by the matchmaking system(s) 140, individually or in cooperation with one or more other elements of the environment 100.

At block 202, one or more human player(s) 122 who wish to play an online game may be identified. The one or more human player(s) 122 may be identified by the matchmaking system(s) 140 based at least in part on a message and/or an indication from the game system(s) 110 and/or game client device(s) 120 that the one or more human player(s) 122 wish to play the online game. In other cases, the matchmaking system(s) 140 may repeatedly access a shared list and/or database that provides information about human players 122 who wish to join different online games. Such a shared list and/or database may be updated by any or all of the matchmaking system(s) 140, the game system(s) 110, and/or the game client device(s) 120. In example embodiments, a player identifier, such as a player account login or other profile information, corresponding to human players 122 may be used to identify the players 122 who wish to play the online game.

At block 204, a skill score, latency and/or other data for each of the one or more human players 122 may be determined. The skill score for each of the one or more human players 122 may be determined by accessing a player datastore 142 and using a player identifier for each of the human players 122 to access the respective skill scores for the human player(s) 122. In some cases, if a human player 122 does not have an established playing history then a default skill score may be ascribed to him/her until he/she establishes a playing history sufficient to provide a skill score based on his or her playing abilities. For example, a new human player 122, may be ascribed a skill score of 35 on a 1 to 100 scale, indicating an expected below-average skill for a particular online game.

In some cases, the matchmaking system(s) 140 may receive an indication of network latency and/or network bandwidth from the game system(s) 110 and/or the game client device(s) 120. In other cases, the matchmaking system(s) 140 may request the game client device(s) 120 to measure the network latency and/or bandwidth. In response to such a request from the matchmaking system(s) 140 for a particular human player 122, the respective game client device 120 may measure a network latency between itself and the game system 110. Any suitable mechanism for measuring network latency and/or network bandwidth may be used, such as a ping test. In cases where the game client device(s) 120 may be geographically distributed, the data center or the gaming system 110 that will host the online game may conduct the ping test. The other data may include any additional attributes of the human players 122 to be matched, such as playstyle, team play history, and so on.

At block 206, preliminary matching of the human players 122 may be performed to form preliminary matchups for one or more instances of the online game(s) for the one or more human players 122 based at least in part on the skill scores, latency and/or other data corresponding to each of the one or more human players 122.

In some examples, as each human player 122 that wishes to play the online game is considered, existing preliminary matchups may be checked to determine whether the player being consider is suitable to fill an unfilled slot in an existing preliminary matchup. If the human player 122 being considered is unsuitable for the existing preliminary matchups, a new preliminary matchup may be instantiated. If all player slots in a preliminary matchup are filled, the matchmaking systems 140 may queue the preliminary matchup for instantiation as an online game (e.g. at block 214). The preliminary matching at block 208 may continue for incomplete preliminary matchups until each player that wishes to play an online game has been considered or until a time limit or other limit is reached (e.g. an existing preliminary matchup has been pending without completion for some amount of time).

At block 208, one or more unfilled player slots in one or more preliminary matchups may be identified. In other words, the matchmaking system(s) 140 may identify one or more player slots in the preliminary matchups formed at block 206 for which suitable human players 122 were unavailable. At block 210, the matchmaking system(s) 140 may determine one or more unavailable players that are suitable to fill the one or more unfilled player slots in the preliminary matchups and for which behavior simulation models are available. The suitable unavailable player(s) for which behavior simulation models are available may be identified by way of the player datastore 142. In addition or alternatively, the model datastore 144 may be searched directly to find a behavior simulation model of a respective unavailable player which provides a simulated player suitable to fill the slot. As discussed above, the suitability of unavailable players for which behavior simulation models are available may be determined using the same or similar matchmaking factors as utilized in block 206 for the preliminary matching of available human players 122. At block 212, one or more simulated player(s) based on behavior simulation models for the one or more suitable but unavailable players may be instantiated and selected to fill respective unfilled slots in the preliminary matchups. Simulated players 132 may be added to the preliminary matchups in this manner until the preliminary matchups are complete (e.g. the player slots are all filled).

At block 214, the one or more instances of the online game(s) may be instantiated based on the completed preliminary matchups. For example, having matched the human player(s) 122 and/or simulated player(s) 132, the matchmaking system(s) 140 may trigger and instruct generation of instance(s) of the online game(s) for the match(es). More particularly, the matchmaking system(s) 140 may send the behavior simulation model(s) of any simulated player(s) 132 to be included in an instance of the online game to the simulated player client system(s) 130 with instructions for the simulated player client system(s) 130 to instantiate the simulated player 132 using the behavior simulation model. The matchmaking system(s) 140 may then request the game system(s) 110 instantiate an online game between the matched human players 122 and simulated players 132. For example, the matchmaking system(s) 140 may provide connection information for the game client device(s) 120 and simulated player client system(s) 130 to the game system(s) 110 for instantiation of an instance of the online game between the matched human players 122 and simulated players 132.

It should be noted that some of the operations of method 200 may be performed out of the order presented, with additional elements, and/or without some elements. Some of the operations of method 200 may further take place substantially concurrently and, therefore, may conclude in an order different from the order of operations shown above. Further, implementations are not limited to the details of the above examples and variations are possible. For example, while method 200 may be performed for a pool of players to generate preliminary matchups, other examples may perform matching in a pairwise manner for particular players.

FIG. 3 illustrates a chart 300 of an example set of player matchmaking according to each player's respective skill score, availability of the player and availability of a behavior simulation model based on the player, in accordance with example embodiments of the disclosure.

The chart 300 shows a number of players, such as player A through player I who have corresponding skill scores as shown. For example, player C may have a skill score of 48, while player H may have a skill score of 87. The skill scores used in this example may be on a 0-100 range, but any suitable range (e.g., 0-1, 0-50, etc.) may be used according to example embodiments of the disclosure. As discussed above, the skill scores may be determined by the matchmaking system(s) 140 by accessing a player datastore 142 and/or model datastore 144. In example embodiments, the matchmaking system(s) 140, by using a player's identifier, may be able to access the player's skill score from the player datastore 142.

The chart 300 further shows whether a behavior simulation model is available for each of the players. For example, player D does not have a behavior simulation model available, while player F has a behavior simulation model available. Whether a player has an available behavior simulation model may be determined by the matchmaking system(s) 140 using an indication from the player datastore 142 or model datastore 144.

The chart 300 further shows whether the player is online and/or wishes to be matched for a game. For example, player A is online, while player B is not online. In the illustrated example, for ease of illustration, players who are online but do not want to be matched or who are offline and have no available behavior simulation model available are not shown.

Based at least in part on the skill scores for the human players 122, the human player(s) 122 and/or simulated player(s) 132 may be combined into different online games. This process may involve finding those players who have respective skill scores that are within a threshold value of each other. For example, as shown, three instances of the online games may be formed for the online players. Each of the human player(s) 122 and/or simulated player(s) 132 in the instances may have skill scores that are within a threshold of each other. As shown, Online Game 1 may include players A and G, while Online Game 2 may include players C and F, while Online Game 3 may include player D. Following the matching of the online human player 122, the matchmaking system(s) 140 may determine Online Game 1 has one unfilled slot, Online Game 2 has two unfilled slots and Online Game 3 has one unfilled slot. The matchmaking system(s) 140 may the determine that a simulated player based on behavior simulation models of player H (indicated by the asterisk) matches the unfilled slot in Online Game 1 (e.g. based on skill score). Similarly, simulated players based on behavior simulation models of players B and I match the unfilled slots in Online Game 2 and a simulated player based on behavior simulation model of player E matches the unfilled slot in Online Game 3. Each of these online games may instantiated by sending the corresponding online game rosters to the game system(s) 110.

While the above examples relate to matchmaking among a pool of players that wish to play an online game, variations are within the scope of this disclosure. For example, FIGS. 4-6 relate to matchmaking among teams of human player(s) 122 and/or simulated player(s) 132.

Figure 4:
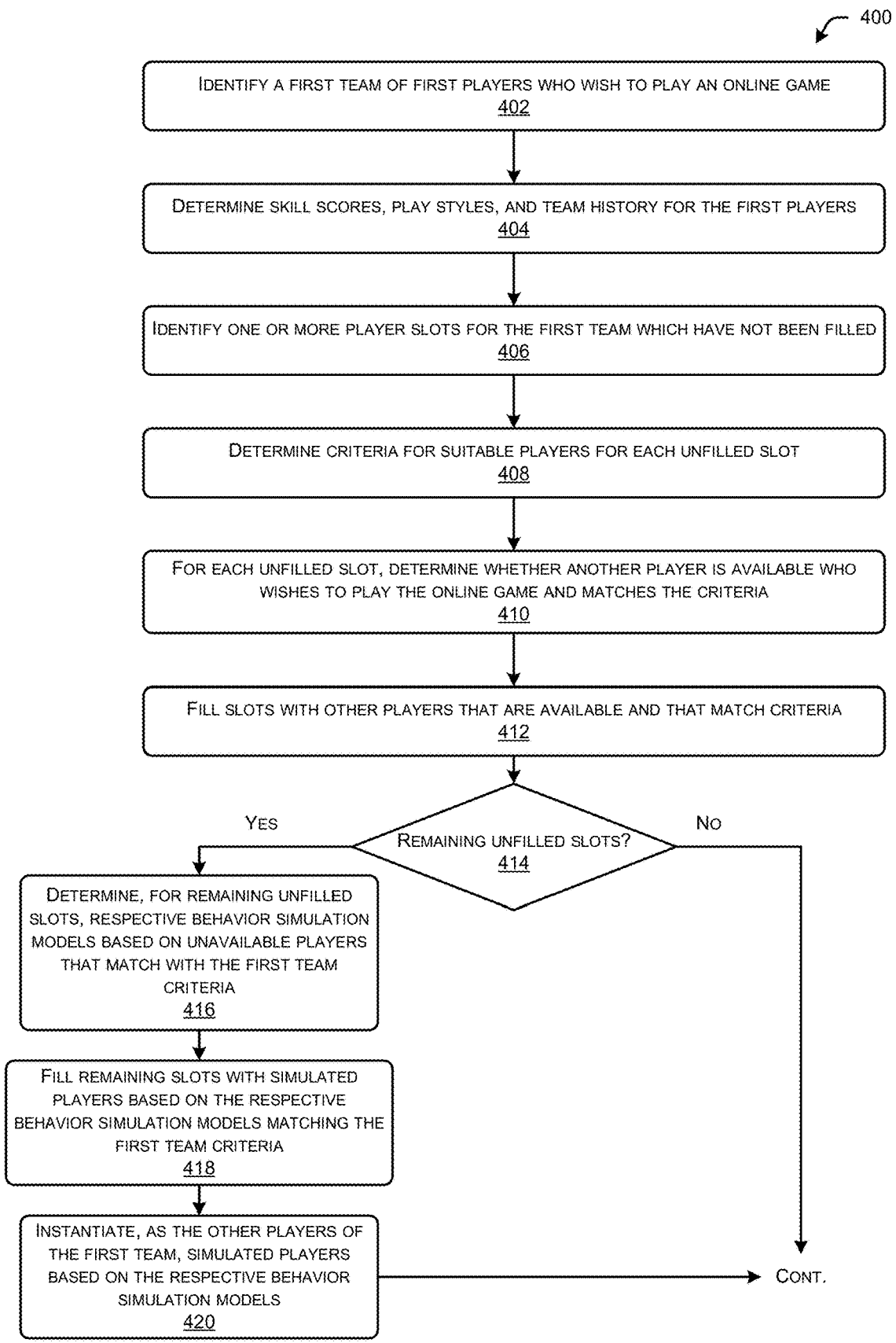
FIG. 4 illustrates a flow diagram of an example method to match players to form a team for a team based online game including human players and/or simulated players, in accordance with example embodiments of the disclosure.

FIG. 4 illustrates a flow diagram of an example method 400 to match human players 122 of a first team with simulated players 132 to form a completed team for an online game, in accordance with example embodiments of the disclosure. The method 400 may be performed by the matchmaking system(s) 140, individually or in cooperation with one or more other elements of the environment 100.

At block 402, a first team of first players who wish to play an online game may be identified. This identification may be based upon a message and/or indication sent from the game system(s) 110 or one or more of the game client device(s) 120 and may indicate the first team of first players wish to play the online game. In other cases, the matchmaking system(s) 140 may repeatedly access a shared list and/or database that provides information about teams of human players 122 who wish to join different online games. Such a shared list and/or database may be updated by any or all of the matchmaking system(s) 140, the game system(s) 110, and/or the game client device(s) 120. In example embodiments, a player identifiers, such as a player account login or other profile information, corresponding to human players 122 may be used to identify the human players 122 who wish to play the online game and a team identifier or group identifier may be used to identify a user formed team including the first players.

At block 404, a skill score, playstyles and team history for each of the first players may be determined. The skill score, playstyles and team history for each of the first players may be determined by accessing a player datastore 142 and using a player identifier for each of the first players to access the respective skill scores for the first player(s). In some cases, if a human player 122 does not have an established playing history then a default skill score may be ascribed to him/her until he/she establishes a playing history sufficient to provide a skill score based on his or her playing abilities. For example, a new human player 122 may be ascribed a skill score of 35 on a 1 to 100 scale, indicating an expected below-average skill for a particular online game. Similar default values for playstyles and team history may be utilized.

At block 406, one or more unfilled player slots in the first team may be identified. In other words, the matchmaking system(s) 140 may identify one or more player slots in the first team identified at 402 for which suitable human player(s) 122 and/or simulated player(s) 132 are desired.

At block 408, the matchmaking system(s) 140 may determine criteria for suitable players for each unfilled slot in the first team. For example, the matchmaking system(s) 140 may determine a range of skill scores, one or more playstyles, a team history and so on that may be deemed suitable when matching human players 122,132 to the respective unfilled slot.

At block 410, for each unfilled slot in the first team, the matchmaking system(s) 140 may determine whether another player is available who wishes to play the online game and who matches the criteria. At block 412, the matchmaking system(s) 140 may fill each unfilled slot for which another player is determined to be available who wishes to play the online game and who matches the criteria.

At block 414, the matchmaking system(s) 140 may determine whether unfilled slots remain in the first team. If so, the process may continue to block 416. Otherwise, the process may continue to the start of the process illustrated in FIG. 5.

At block 416, the matchmaking system(s) 140 may determine, for each remaining unfilled slots, respective behavior simulation models that match with the criteria for the particular slot. The matching behavior simulation model for which behavior simulation models are available may be identified by way of the player datastore 142. In addition or alternatively, the model datastore 144 may be searched directly to find a behavior simulation model of a respective unavailable player which provides a simulated player suitable to fill the slot. As discussed above, the suitability of a behavior simulation model may be determined using the same or similar matchmaking factors as utilized in 410 for matching of other players to the first team. At block 418, one or more matching behavior simulation models may be selected to fill respective unfilled slots in the first team. Then, at block 420, one or more simulated player(s) based on the selected behavior simulation models may be instantiated.

The process 400 may then transition to matching the completed first team with a second team in FIG. 500 at 502.

Figure 5:
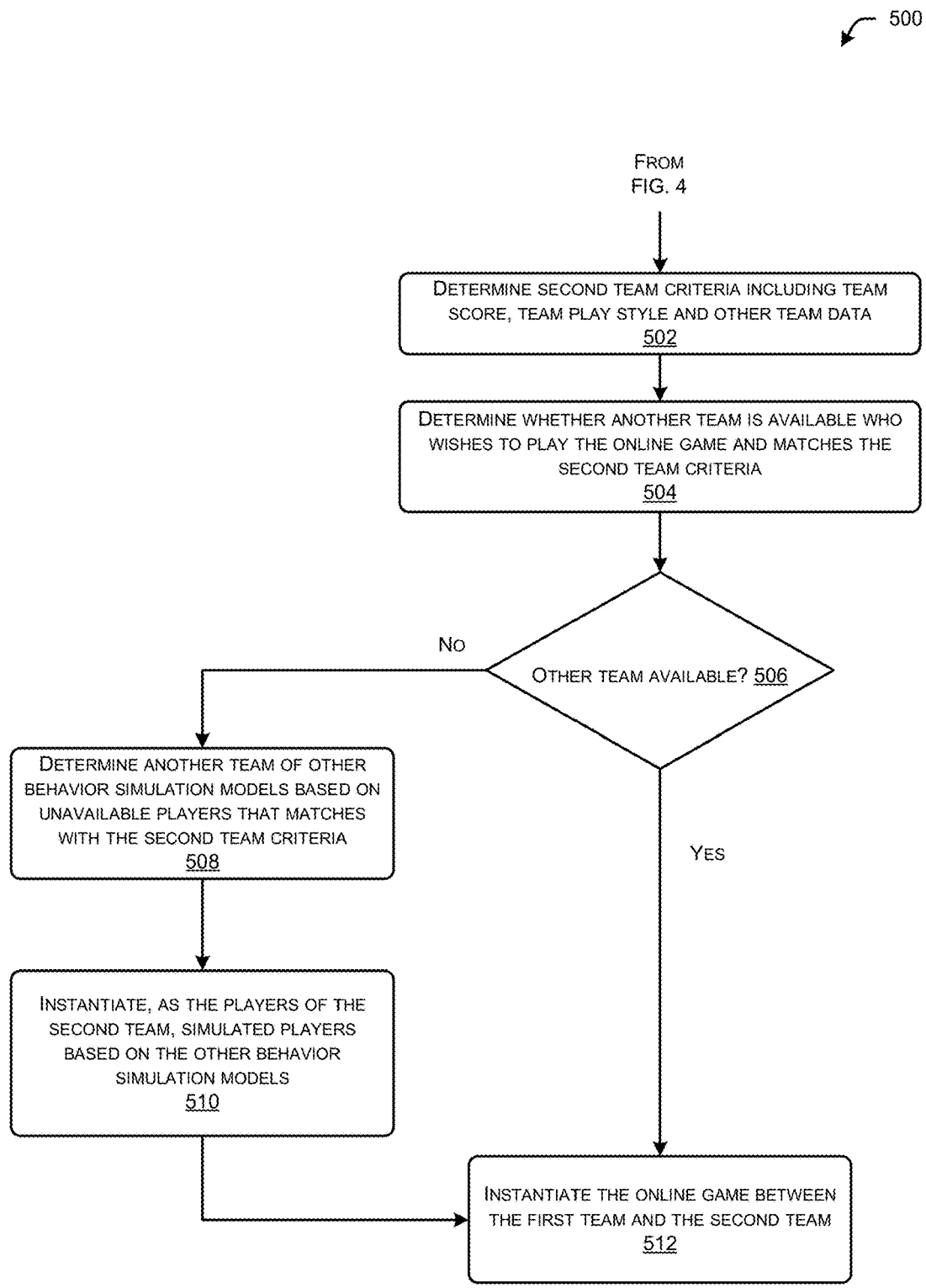
FIG. 5 illustrates a flow diagram of an example method to match teams of human players and/or simulated players for a team based online game, in accordance with example embodiments of the disclosure.

FIG. 5 illustrates a flow diagram of an example method 500 to match a second team of players and/or simulated players with a first team for an online game, in accordance with example embodiments of the disclosure. In some examples, the method 500 follows method 400. However, examples are not so limited and methods 400 and 500 may both be performed separately or in conjunction. The method 500 may be performed by the matchmaking system(s) 140, individually or in cooperation with one or more other elements of the environment 100.

At block 502, the matchmaking system(s) 140 may determine second team criteria including team score, team playstyle and other team data for matching with the first team. In some examples, the determination of the team score, team playstyle and other team data for matching with the first team may be determined based on attributes or data regarding the players of the first team (e.g. whether human or simulated).

At block 504, the matchmaking system(s) 140 may determine whether another team is available who wishes to play the online game and matches the second team criteria. The other teams searched at block 504 may be other teams of human players or human and simulated players. The other teams may be matched in the same manner as the first team using method 400.

At block 506, the matchmaking system(s) 140 may determine if another team was available at block 504. If so, the method continues to block 512. Otherwise, the method continues to block 508.

At block 508, the matchmaking system(s) 140 may determine another team of other behavior simulation models based on unavailable players which matches the second team criteria. For example, the second team criteria may specify a team with a skill score range between 50 and 65, playstyles that favor strategies treating the online game as if in real life, and no prior history of playing as a team (e.g. because the first team are new players and lack cohesion). The matchmaking system(s) 140 may then select behavior simulation models which, taken together, meet the second team criteria.

At block 510, the matchmaking system(s) 140 may instantiate, as the players of the second team, simulated players based on the other behavior simulation models. Then, at block 512, the matchmaking system(s) 140 may instantiate the online game between the first team and the second team It should be noted that some of the operations of method 500 may be performed out of the order presented, with additional elements, and/or without some elements. Some of the operations of method 500 may further take place substantially concurrently and, therefore, may conclude in an order different from the order of operations shown above.

FIG. 6 illustrates a chart 600 of an example set of team based player matchmaking according to each player's respective skill score, team history and playstyle, in accordance with example embodiments of the disclosure.

Similar to chart 300 of FIG. 4, chart 600 shows a number of players, such as player A through player I who have corresponding skill scores as shown. For example, player F may have a skill score of 54, while player G may have a skill score of 75. The skill scores used in this example may be on a 0-100 range, but any suitable range (e.g., 0-1, 0-50, etc.) may be used according to example embodiments of the disclosure. As discussed above, the skill scores may be determined by the matchmaking system(s) 140 by accessing a player datastore 142. In example embodiments, the matchmaking system(s) 140, by using a player's identifier, may be able to access the player's skill score from the player datastore 142.

The chart 600 further shows whether a behavior simulation model is available for each of the players. For example, player D does not have a behavior simulation model available, while player F has a behavior simulation model available. Whether a player has an available behavior simulation model may be determined by the matchmaking system(s) 140 using an indication from the player datastore 142 or model datastore 144.

The chart 600 further shows whether the player is online and/or wishes to be matched for a game. For example, player A is online, while player H is not online. In the illustrated example, for ease of illustration, players who are online but do not want to be matched or who are offline and have no available behavior simulation model available are not shown.

The chart 600 further shows team histories of the various human players. For example, player A has a history of teaming with players D and H, while players D and H have a history of teaming with player A but not one another. The matchmaking system(s) 140 may utilize the team histories to provide preferential matching between human players 122/simulated players 132 when the players have histories of teaming up. In a first example, the matchmaking may match a human player with a simulated teammate based on a history of other players the human player plays with regularly. This is illustrated in the matching of player G with simulated player E. In this way, the simulated teammate may behave in a more natural or expected manner from the perspective of the human player. In a second example, the matchmaking may provide groups of opponents (e.g. on an opposing team) that are based on corresponding human players which play together. This is illustrated in the matching of simulated players F and I. Because the behavior of the team of simulated players is based on the behavior of a team of human players that play as a group normally, the simulated players may operate more cohesively, thereby providing more satisfying opponent teams.

Moreover, the chart 600 shows the playstyle of the player, in the context of whether the player tends to play aggressively or passively. Given the information in the table of FIG. 6, the matchmaking system(s) 140 may complete team 2 by matching a simulated player based on the behavior of player E with player G, then because no team is available that matches team 3, assembling team 4 based on the information indicating players F and I match as a team and as an opponent team to team 3.

As shown an online game is instantiated between team 1 and team 2 and another online game is instantiated between teams 3 and 4. Each of these online games may instantiated by sending the corresponding online game rosters to the game system(s) 110.

Figure 7:
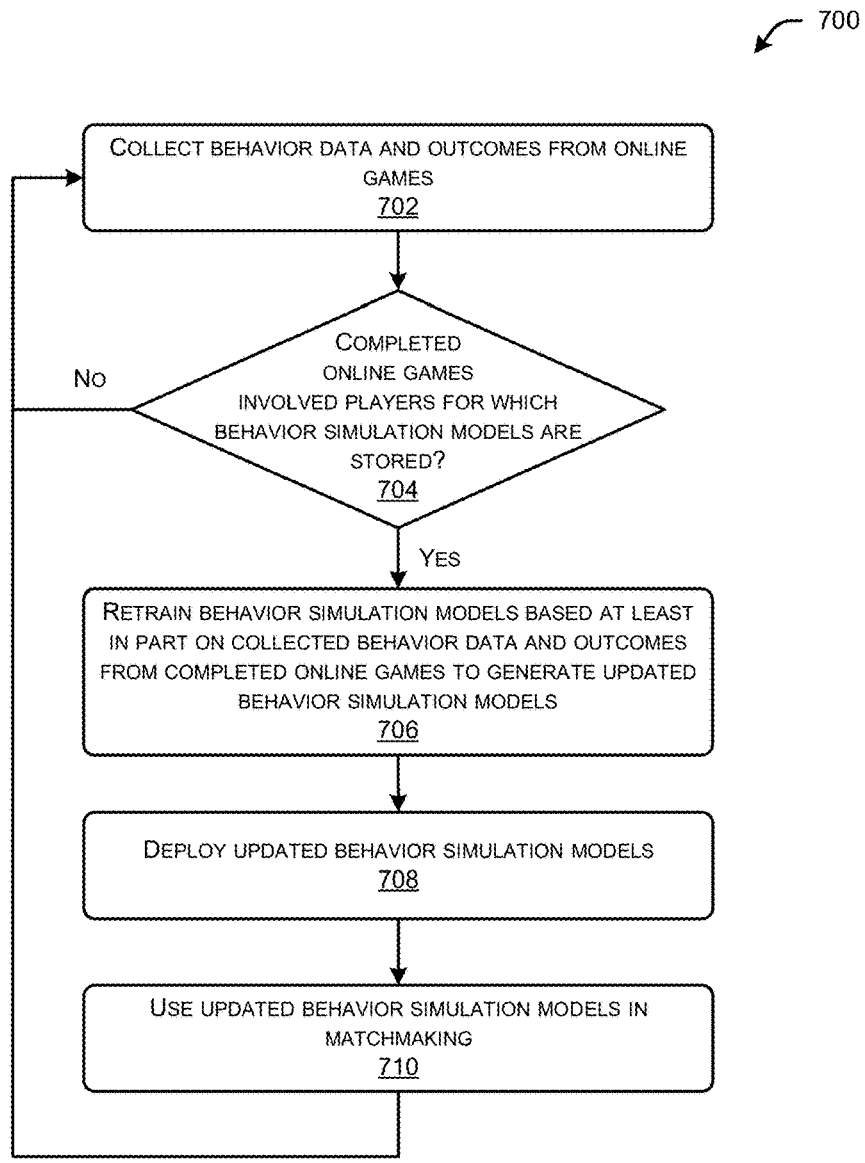
FIG. 7 illustrates a flow diagram of an example method by behavior simulation models may be updated, in accordance with example embodiments of the disclosure.

FIG. 7 illustrates a flow diagram of an example method 700 by which behavior simulation models may be updated, in accordance with example embodiments of the disclosure. The method 700 may be performed by the matchmaking system(s) 150, individually or in cooperation with one or more other elements of the environment 100.

At block 702, the matchmaking system(s) 140 may collect behavior data and outcomes from one or more online games. In some examples, the behavior data and outcomes from the one or more online games may be provided by the game system(s) 110. In other examples, the behavior data and outcomes from one or more online games may be provided by the game client device(s) 120 and simulated player client system(s) 130.

At block 704, the matchmaking system(s) 140 may determine whether the completed online games involved human player(s) 122 for which behavior simulation model(s) are stored in the model datastore 144. In some examples, the matchmaking system(s) 140 may also determine whether the completed games involved human player(s) 122 for which a behavior simulation model is to be or is being generated. In any case, if the games involved human players 122 of interest, the process continues to block 706. Otherwise, the process returns to block 702 for additional data collection.

At block 706, the matchmaking system(s) 140 may retrain the behavior simulation models based at least in part on collected behavior data and outcomes from completed online games to generate updated behavior simulation models. In the case of examples in which a behavior simulation model is to be created for a player, the matchmaking system(s) 140 may initialize the behavior simulation model and perform initial training based at least in part on the collected data.

The matchmaking system(s) 140 may deploy the updated behavior simulation models to the model datastore 144 at 708. In some examples, the matchmaking system(s) 140 may update the player datastore 142 and model datastore 144 accordingly. Then, at block 710, the matchmaking system(s) 140 may use the updated behavior simulation models in matchmaking and return to block 702 to collect further behavior data and outcomes from one or more additional online games.

It should be noted that some of the operations of method 700 may be performed out of the order presented, with additional elements, and/or without some elements. Some of the operations of method 700 may further take place substantially concurrently and, therefore, may conclude in an order different from the order of operations shown above.

Figure 8:
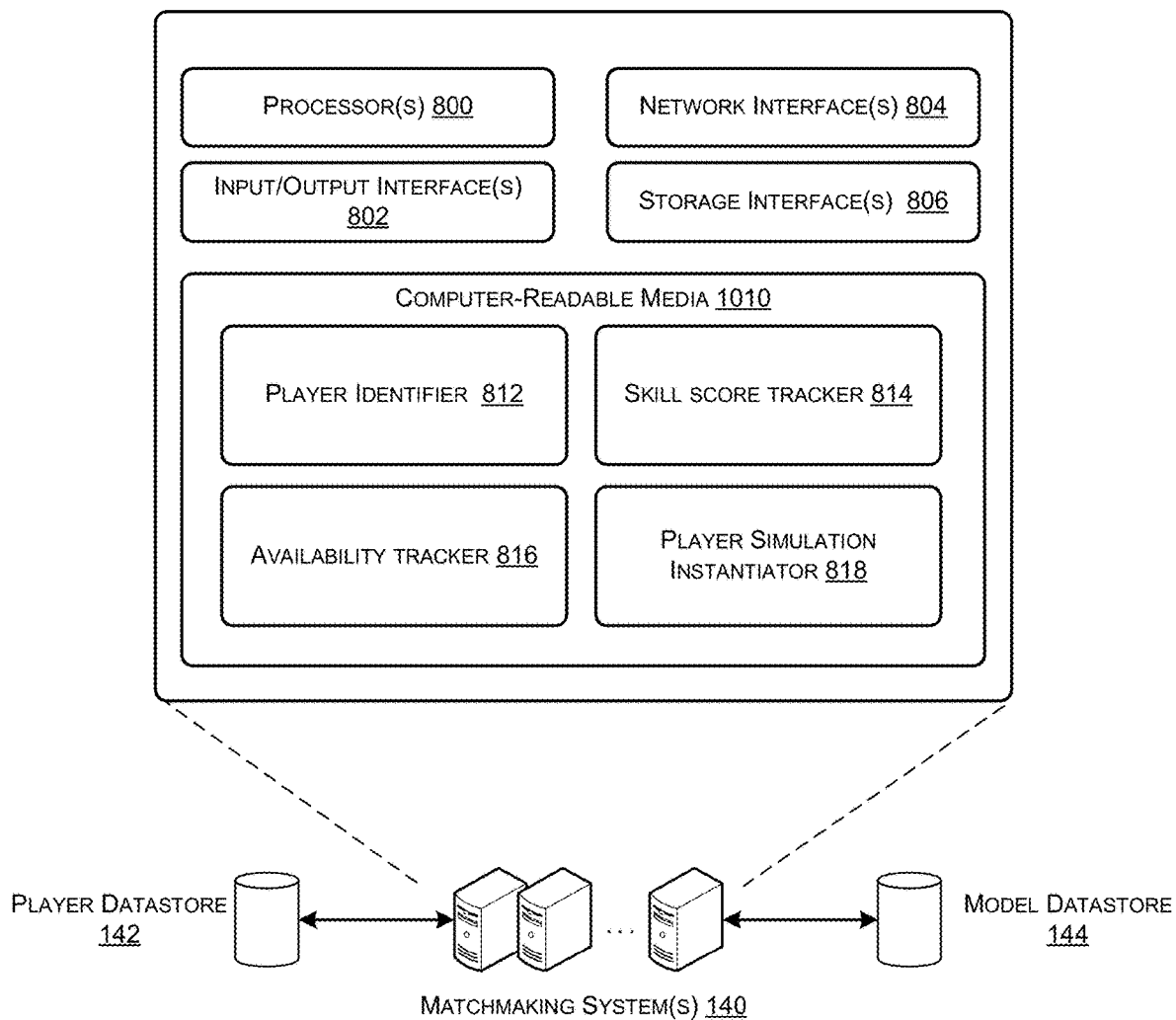
FIG. 8 illustrates a block diagram of example matchmaking system(s) that may provide matchmaking for online games, in accordance with example embodiments of the disclosure.

FIG. 8 illustrates a block diagram of example matchmaking system(s) 140 that may provide matchmaking for online games, in accordance with example embodiments of the disclosure. The matchmaking system(s) 140 may include one or more processor(s) 800, one or more input/output (I/O) interface(s) 802, one or more network interface(s) 804, one or more storage interface(s) 806, and computer-readable media 810.

In some implementations, the processors(s) 800 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip system(s) (SOCs), complex programmable logic devices (CPLDs), etc. Additionally, each of the processor(s) 800 may possess its own local memory, which also may store program modules, program data, and/or one or more operating system(s). The one or more processor(s) 800 may include one or more cores.

The one or more input/output (I/O) interface(s) 802 may enable the matchmaking system(s) 140 to detect interaction with a user and/or other system(s), such as one or more game system(s) 110. The I/O interface(s) 802 may include a combination of hardware, software, and/or firmware and may include software drivers for enabling the operation of any variety of I/O device(s) integrated on the matchmaking system(s) 140 or with which the matchmaking system(s) 140 interacts, such as displays, microphones, speakers, cameras, switches, and any other variety of sensors, or the like.

The network interface(s) 804 may enable the matchmaking system(s) 140 to communicate via the one or more network(s). The network interface(s) 804 may include a combination of hardware, software, and/or firmware and may include software drivers for enabling any variety of protocol-based communications, and any variety of wireline and/or wireless ports/antennas. For example, the network interface(s) 804 may comprise one or more of a cellular radio, a wireless (e.g., IEEE 802.1x-based) interface, a Bluetooth® interface, and the like. In some embodiments, the network interface(s) 804 may include radio frequency (RF) circuitry that allows the matchmaking system(s) 140 to transition between various standards. The network interface(s) 804 may further enable the matchmaking system(s) 140 to communicate over circuit-switch domains and/or packet-switch domains.

The storage interface(s) 806 may enable the processor(s) 800 to interface and exchange data with the computer-readable medium 810, as well as any storage device(s) external to the matchmaking system(s) 140, such as the player datastore 142 and the model datastore 144.

The computer-readable media 810 may include volatile and/or nonvolatile memory, removable and non-removable media implemented in any method or technology for storage of information, such as computer-readable instructions, data structures, program modules, or other data. Such memory includes, but is not limited to, random access memory (RAM), read-only memory (ROM), electrically erasable programmable read-only memory (EEPROM), flash memory or other memory technology, CD-ROM, digital versatile discs (DVD) or other optical storage, magnetic cassettes, magnetic tape, magnetic disk storage or other magnetic storage devices, RAID storage system(s), or any other medium which can be used to store the desired information and which can be accessed by a computing device. The computer-readable media 810 may be implemented as computer-readable storage media (CRSM), which may be any available physical media accessible by the processor(s) 800 to execute instructions stored on the computer readable media 810. In one basic implementation, CRSM may include RAM and Flash memory. In other implementations, CRSM may include, but is not limited to, ROM, EEPROM, or any other tangible medium which can be used to store the desired information and which can be accessed by the processor(s) 800. The computer-readable media 810 may have an operating system (OS) and/or a variety of suitable applications stored thereon. The OS, when executed by the processor(s) 800 may enable management of hardware and/or software resources of the matchmaking system(s) 140.

Several functional blocks having instruction, data stores, and so forth may be stored within the computer-readable media 810 and configured to execute on the processor(s) 800. The computer readable media 810 may have stored thereon a player identifier block 812, a skill score tracker block 814, an availability block 816, and a player simulation instantiation block 818. It will be appreciated that each of the functional blocks 812, 814, 816, 818, 820, 822, may have instructions stored thereon that when executed by the processor(s) 800 may enable various functions pertaining to the operations of the matchmaking system(s) 150.

The instructions stored in the player identifier block 812, when executed by the processor(s) 800, may configure the matchmaking system(s) 150 to identify player(s), such as new player(s) who wish to join an online game. In some cases, the processor(s) 800 may request player identification information, such as from the game system(s) 110 and/or game client devices(s) 120. The processor(s) 800 may also match players based upon their corresponding skill scores and/or other player data.

The instructions stored in the skill score tracker block 814, when executed by the processor(s) 800, may configure the matchmaking system(s) 140 to determine skill scores of players who wish to play an online game. The processor(s) 800 may further use player identification information to access the player datastore and the model datastore to access information, such as skill scores of players and simulated players. The processor(s) 800 may also update skill scores based at least in part on player performance. In some examples, the skill score tracker block 814 may further determine or track other player data utilized in matchmaking. Such other player data is not limited to particular matchmaking data and may include team history data, playstyle data, and so on.

The instructions stored in the availability tracker block 816, when executed by the processor(s) 800, may configure the matchmaking system(s) 150 to determine whether unavailable players have a behavior simulation model available for matching with one or more human players. In some cases, the processor(s) 800 may solicit the availability information from the model datastore 144 and/or the player datastore 142.

The instructions stored in the player simulation instantiator block 818, when executed by the processor(s) 800, may configure the simulated player client system(s) 130 to provide a simulated player 132 using a particular behavior simulation model.

The illustrated aspects of the claimed subject matter may also be practiced in distributed computing environments where certain tasks are performed by remote processing devices that are linked through a communications network. In a distributed computing environment, program modules can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of system(s), methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Computer-executable program instructions may be loaded onto a general purpose computer, a special-purpose computer, a processor, or other programmable data processing apparatus to produce a particular machine, such that the instructions that execute on the computer, processor, or other programmable data processing apparatus for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system, comprising:
   one or more processors; and
   one or more computer-readable media storing computer-executable instructions that, when executed by the one or more processors, cause the one or more processors to:
   determine a first skill score associated with a first player for an online game;
   determine a second skill score associated with a second player for the online game;
   determine that the first skill score is within a threshold of the second skill score;
   determine that the second player is unavailable;
   determine that a behavior simulation model is available, wherein the behavior simulation model is based on the second player;
   instantiate a simulated player based on the behavior simulation model such that the simulated player exhibits latency effects, by instantiating the simulated player on hardware remote from a server hosting the online game; and
   instantiate the online game with the first player and the simulated player.

2. The system of claim 1, wherein the computer-executable instructions further cause the one or more processors to:
   receive, from a game system, a first message indicating that the first player is to be matched for online gaming for the online game.

3. The system of claim 1, wherein to determine the second skill score associated with the second player, the computer-executable instructions further cause the one or more processors to:
   determine an identifier of the second player;
   access a player datastore storing respective player skill scores corresponding to a plurality of players, the plurality of players comprising the second player; and
   determine, from the player datastore the second skill score based at least in part on the identifier.

4. The system of claim 1, wherein the computer-executable instructions further cause the one or more processors to:
   perform a search for another player that is available and that matches with the first player for the online game, matching with the first player at least including having an associated skill score within a threshold of the first skill score; and
   wherein the determining that the behavior simulation model is available and instantiation of the simulated player are performed based at least in part on the search failing to return another player that is available and that matches with the first player for the online game.

5. The system of claim 1, wherein to instantiate the online game with the first player and the simulated player, the computer-executable instructions further cause the one or more processors to:
   initiate an instance of the online game with the first player and the simulated player that presents the simulated player to the first player as if the second player were controlling the simulated player.

6. The system of claim 1, wherein the online game is a first instance of the online game, the computer-executable instructions further cause the one or more processors to:
   collect, for one or more second instances of the online game, outcomes for the one or more second instances and behavior data for the second player during the one or more second instances;
   retrain the behavior simulation model using the outcomes for the one or more second instances and the behavior data for the second player during the one or more second instances.

7. A computer-implemented method, comprising:
   determining a first skill score associated with a first player for an online game;
   determining a behavior simulation model is available, wherein the behavior simulation model is for a simulated player of the online game;
   determining a second skill score associated with the behavior simulation model for the online game;
   determining the behavior simulation model matches with the first player based at least on the first skill score being within a threshold of the second skill score;
   instantiating a simulated player based on the behavior simulation model such that the simulated player exhibits latency effects by one or more of:
      instantiating the simulated player on hardware remote from a server hosting the online game; or
      instantiating the simulated player to include a delay approximating latency effects for received incoming data from the online game and for outgoing data sent to the online game; and
   instantiating the online fame with the first player and the simulated player.

8. The computer-implemented method of claim 7, wherein the behavior simulation model is based on behavior of a second player.

9. The computer-implemented method of claim 8, the determining the behavior simulation model is available comprises:
   determining an identifier of the behavior simulation model;
   accessing a behavior simulation model datastore storing respective behavior simulation models corresponding to a plurality of players, the plurality of players comprising the second player; and
   determining, from the behavior simulation model datastore, the behavior simulation model is present based at least in part on the identifier.

10. The computer-implemented method of claim 8, the method further comprising:
    determining a first playstyle corresponding to the first player;
    determining a second playstyle of the behavior simulation model;
    determining the first playstyle and second playstyle match for the online game; and
    wherein the determining the behavior simulation model matches with the first player is further based at least in part on the determining that the first playstyle and second playstyle match for the online game.

11. The computer-implemented method of claim 8, wherein instantiating the online game with the first player and the simulated player instantiates a first instance of the online game, the online game is a team based online game, the method further comprises:
  performing a search for another player that is available and that matches with the first player for the online game, the determining that the behavior simulation model is available and instantiation of the simulated player being performed in response to the search failing to return another player that is available and that matches with the first player for the online game;
  determining a team history corresponding to the first player, the team history indicative of other players that the first player has teamed with for a plurality of second instances of the online game;
  determining the second player is included in the team history corresponding to the first player, the determining that the behavior simulation model matches with the first player being further based at least in part on the team history corresponding to the first player including the second player.

12. The computer-implemented method of claim 8, wherein instantiating the online game with the first player and the simulated player comprises:
  initiating an instance of the online game with the first player and the simulated player that presents the simulated player to the first player as if the second player were controlling the simulated player.

13. The computer-implemented method of claim 8, wherein the online game is a first instance of the online game, the method further comprising:
  collecting, for one or more second instances of the online game, outcomes for the one or more second instances and behavior data for the second player during the one or more second instances;
  retraining the behavior simulation model based on the second player using the outcomes for the one or more second instances and the behavior data for the second player during the one or more second instances.

14. A system, comprising:
  one or more processors; and
  one or more computer-readable media storing computer-executable instructions that, when executed by the one or more processors, cause the one or more processors to perform operations comprising:
  determining a first plurality of first players who wish to play an online game as a first team;
  determining one or more unfilled slots for the online game to fill with simulated players;
  determining one or more behavior simulation models suitable to fill corresponding unfilled slots, wherein the one or more behavior simulation models provide one or more corresponding simulated players;
  instantiating the one or more corresponding simulated players based on the one or more behavior simulation models such the one or more corresponding simulated players exhibit latency effects by instantiating the one or more corresponding simulated players to include a delay approximating latency effects for received incoming data from the online game and for outgoing data sent to the online game; and
  filling the one or more unfilled slots with the one or more corresponding simulated players;
  instantiating the online game with the first plurality of first players and the one or more corresponding simulated players.

15. The system of claim 14, wherein the unfilled slots are unfilled slots in a second team to play against the first team as opponents in the online game, the one or more behavior simulation models are based on one or more corresponding second players of a plurality of second players and wherein determining the one or more behavior simulation models that provide the one or more corresponding simulated players suitable to fill the corresponding unfilled slots comprises:
  determining respective skill scores for the first plurality of first players;
  determining, based on team history data of the plurality of second players, a third plurality of second players whose team history data indicates the third plurality of second players are associated as a team;
  determining respective skill scores for the third plurality of second players;
  determining the respective skill scores for the first plurality of first players match with the respective skill scores for the third plurality of second players; and
  determining, in response to determining the respective skill scores for the first plurality of first players match with the respective skill scores for the third plurality of second players, a plurality of behavior simulation models corresponding to the third plurality of second players are suitable to fill the corresponding unfilled slots.

16. The system of claim 15, wherein the computer-executable instructions further cause the one or more processors to:
  determine one or more first playstyles of first plurality of first players match with one or more second playstyles of the third plurality of second players; and
  the determining the plurality of behavior simulation models corresponding to the third plurality of second players are suitable to fill the corresponding unfilled slots is further in response to the determining the one or more first playstyles of first plurality of first players match with the one or more second playstyles of the third plurality of second players.

17. The system of claim 14, wherein the one or more behavior simulation models are based on one or more corresponding second players of a plurality of second players;
  the instantiating the online game with the first plurality of first players and the one or more corresponding simulated players comprises:
    initiating an instance of the online game with the first plurality of first players and the one or more corresponding simulated players that presents the one or more corresponding simulated players to the first plurality of first players as if the one or more corresponding second players were controlling the corresponding simulated players.

18. The system of claim 14, wherein the one or more unfilled slots are one or more unfilled slots in the first team, the one or more behavior simulation models are based on one or more corresponding second players of a plurality of second players and wherein the determining the one or more behavior simulation models that provide the one or more corresponding simulated players suitable to fill the corresponding unfilled slots comprises:
  determining one or more of skill score data, playstyle data, and team history data for the first plurality of first players and for the one or more corresponding second players;

determining the one or more corresponding second players match the first plurality of first players based on one of the skill score data, the playstyle data, and the team history data; and determining the one or more behavior simulation models are suitable to fill the one or more unfilled slot based on the determining the one or more corresponding second players match the first plurality of first players based on one of the skill score data, the playstyle data, and the team history data.

19. The system of claim 14, wherein a particular unfilled slot of the unfilled slots is an unfilled slot in the first team, the particular unfilled slot in the first team having an associated role in the first team, a particular behavior simulation model of the one or more behavior simulation models being based on a corresponding second player of a plurality of second players and wherein the determining the one or more behavior simulation models that provide the one or more corresponding simulated players suitable to fill the corresponding unfilled slots comprises:

determining one or more of skill score data, playstyle data, and team history data for the first plurality of first players and for the corresponding second player in the role associated with the particular unfilled slot;

determining the corresponding second player in the role associated with the particular unfilled slot matches the first plurality of first players based on one of the skill score data, the playstyle data, and the team history data; and determining the particular behavior simulation model is suitable to fill the particular unfilled slot based on the determining the corresponding second player in the role associated with the particular unfilled slot matches the first plurality of first players based on one of the skill score data, the playstyle data, and the team history data.

* * * * *